Figure 1:
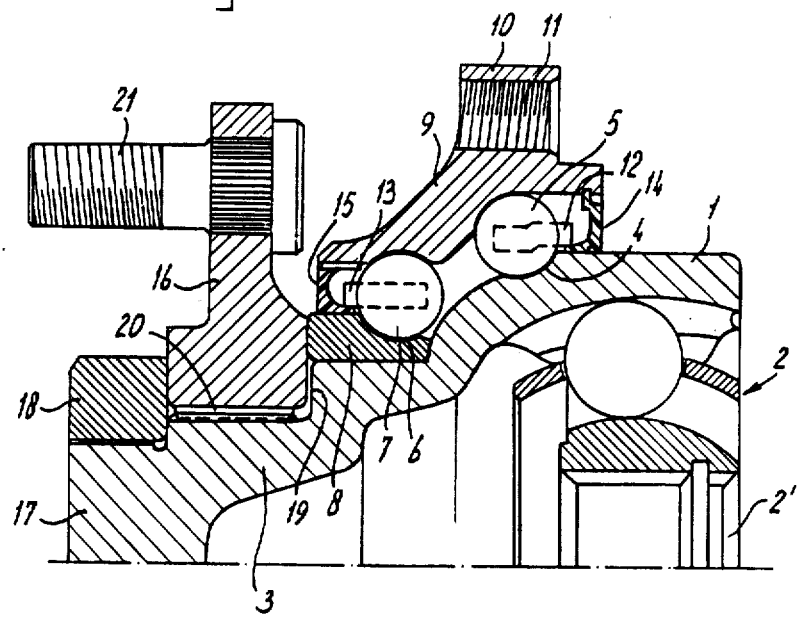

United States Patent [19]

Kapaan

[11] Patent Number: 4,668,111
[45] Date of Patent: May 26, 1987

[54] ROLLER BEARING UNIT

[75] Inventor: Hendikus J. Kapaan, Nieuwegein, Netherlands

[73] Assignee: SKF Industrial Trading & Development Co. B.V., Niewegein, Netherlands

[21] Appl. No.: 779,413

[22] Filed: Sep. 24, 1985

[30] Foreign Application Priority Data

Oct. 22, 1984 [NL] Netherlands ............... 8403209

[51] Int. Cl.[4] ............... F16C 13/00; F16C 35/08; B60K 17/00; F16D 1/00
[52] U.S. Cl. ............... 384/544; 180/70.1; 384/490; 464/184; 464/906
[58] Field of Search ........ 384/461, 490, 504, 512–515, 384/543, 544, 585, 586, 589; 180/70.1, 252–259; 464/178, 906, 184

[56] References Cited

U.S. PATENT DOCUMENTS

| | | | |
|---|---|---|---|
| 1,734,709 | 11/1929 | Bayley | 180/258 |
| 2,956,632 | 10/1960 | Forbush | 384/544 X |
| 3,157,442 | 11/1964 | Gaubatz | 384/544 |
| 3,515,448 | 6/1970 | Williams et al. | 384/589 |
| 3,583,511 | 6/1971 | Asberg | 384/544 X |
| 3,971,604 | 7/1976 | Kapaan | 384/513 |
| 4,417,643 | 11/1983 | Guimbretieré | 180/259 X |
| 4,421,197 | 12/1983 | Chandioux | 180/258 |
| 4,433,877 | 2/1984 | Colanzi | 384/585 X |
| 4,537,270 | 8/1985 | Brandenstein et al. | 180/70.1 |
| 4,571,099 | 2/1986 | Balken et al. | 385/544 X |

Primary Examiner—Stuart S. Levy
Assistant Examiner—Thomas R. Hannon
Attorney, Agent, or Firm—Rosen, Dainow & Jacobs

[57] ABSTRACT

A roller bearing unit comprising an inner race element having a homokinetic coupling at one end and a coaxial extension forming a gudgeon at the other end whereby two rotating tracks for two rows of rolling elements are provided on the outer surface of the inner race, an outer race having a conical shape surrounding the rolling elements and being integral with an attachment flange, whereby the rotating tracks for the rolling elements have different diameters, the larger diameter track being at the homokinetic coupling end and being closest to the attachment flange, the larger diameter track being formed directly on the inner race.

18 Claims, 4 Drawing Figures

ROLLER BEARING UNIT

The invention concerns a roller bearing unit consisting of an inner race with devices for coupling one side of this race to a shaft or similar element which can be made to rotate, in particular a homokinetic coupling, and a coaxial extension at the other side of the race, whereby two rotating tracks for two rows of rolling elements are provided along the outer surface in planes perpendicular to the cardioid, and an outer race surrounding these rolling elements which forms one unit with a flange formed coaxially with the cardioid of the housing for the attachment of the roller bearing unit. The devices are coaxially connected to the extension for the attachment of the element in need of bearing, whereby the rolling elements of each row are separated from each other by a cage, and annular sealing elements are provided on the outside of the rows of rolling elements. A similar roller bearing unit is disclosed in U.S. Pat. No. 3,583,511.

In this known roller bearing unit the tracks for the rolling elements have the same diameter, whereby both tracks run around the extension of the inner race. Accordingly in essence, a standard roller bearing with two rows of rolling elements results, whereby the rolling elements of both rows are separated from each other by one cage.

The object of the invention is to produce an improved roller bearing unit of the type mentioned, whereby the improvement involves in particular the simpler assembly of the bearing unit and the relatively greater carrying capacity of the bearing.

This object is achieved according to the invention by providing the rotating tracks of the rolling elements with different diameters, whereby the track closest to the flange has the larger diameter, and at the least, this track runs along the outer surface of the inner race, whereas the outer race is generally conical in shape. This leads to the advantage that the separate bearing components can be mounted axially so that no special tools or special knowledge are required for assembling the roller bearing.

The coaxial extension of the inner race is preferably equipped with wedge- or tooth-shaped coupling devices. The application of these wedge- or tooth-shaped coupling devices leads to an optimum power transmission between the means for attaching the element in need of bearing or other elements and the roller bearing, while, at the same time, the assembly of the entire unit is greatly simplified.

Because at least one of the tracks for the rolling elements is located in the inner race, the extension can be shortened so that in a bearing whose means of attachment are formed by a second flange, it is possible to provide a gudgeon pointing axially outward and belonging to this second flange; this gudgeon serves to center the wheel to be attached. Consequently, the roller bearing unit according to the invention is highly suitable for front-wheel drive bearings in a motor vehicle.

In a roller bearing unit formed in this manner the outer race is considerably more rigid due to its conical form than in the known unit. In addition, more rolling elements can be inserted in a row, which leads to relatively higher carrying capacities. Furthermore, there is more space between the first and second flanges which makes it possible to fill this space with devices such as an anti-brake blocking device, and to use gudgeon bolts in the openings of the second flange which are easier to reach and therefore easier to adjust. Furthermore, there are separate cages for the two rows of rolling elements, which means that these cages are easy to fabricate and also easy to install. The two sealing rings can be standard sealng rings which have proved to be reliable in practical applications and are relatively inexpensive. An important advantage is that the separate bearing parts can be mounted axially.

The gudgeon can form one unit with the second flange whereby, in an advantageous manner, the element forming the gudgeon and the second flange is fastened inside the aforementioned extension of the inner race. In this case it is preferable that the aforementioned element be equipped with an extension pointing inward, coaxial with the cardioid of the inner race and fastened in the extension of the inner race.

However, the second flange can also be formed by a separate annular element which is mounted around the extension of the inner race and pressed against a shoulder shaped on this race by means of a screw device whose screw thread interlocks with a screw thread of the extension of the inner race.

The screw device can also be a bolt whose head forms the gudgeon, and which bolt is screwed tightly into the extension of the inner race equipped with an inside screw thread, whereby the head of the bolt presses the annular second flange against an annular shoulder shaped on the outside of the inner race.

However, it is also possible for the screw device to consist of a nut screwed tightly around the extension of the inner race equipped with an outside screw thread, up to the outside of the central part of the annular second flange, whereby this part is pressed on the inside against the shoulder. Preferably the nut together with the part equipped with a screw thread will constitute the gudgeon.

The roller bearing unit according to the invention can also be advantageously combined with a planetary transmission whereby the means of attachment are formed by a toothed ring shaped along the outer surface of the extension and, coaxially therewith, a toothed ring shaped along the inner surface of an extension on the outer race, and a number of planetary gears located between and interlocking with these toothed rings and rotating on a planetary gear carrier.

It should be pointed out that U.S. Pat. No. 3,971,604 discloses a roller bearing unit with a housing and two rotating tracks for two rows of rolling elements, whereby these tracks have different diameters. However, the track with the largest diameter is formed at the end of the flange for the attachment of the element in need of bearing, which flange forms one unit with the housing.

The invention is further described with reference to the drawing in which the FIGS. 1, 2, 3 and 4 represent four different embodiments of a roller bearing unit according to the invention, in axial section.

As shown in FIG. 1, the roller bearing unit includes an inner race 1 which contains a homokinetic coupling 2 which allows a drive shaft—not shown here—coupled at 2', to be coupled to this race 1. In addition, the inner race 1 includes an extension 3 which forms one unit with the race 1 in this type embodiment. The outer surface of the inner race 1 contains a track 4 for the row of rolling elements 5, while a second track 6 is available for a second row of rolling elements 7, and the diameter of this second track 6 is smaller than the diameter of track 4. Track 6 is formed in a separate annular element 8 which is mounted in the axial direction around part of the outer surface of the extension 3. Furthermore, the row of rolling elements 5 and 7 is surrounded by an outer race 9 equipped with tracks for the rows of rolling elements 5 and 7 and generally conical in shape. The outer race 9 forms one unit with a first flange 10 which has a number of openings 11 and which serves to attach the roller bearing unit. The rolling elements 5, respectively 7, are contained in separate cages 12 and 13 and there are also sealing rings 14 and 15 on the sides of the outer race.

A second flange 16 in the form of a separate annular element has been mounted around the other part of the outer surface of the extension 3. The extension 3 is further extended with a part 17 equipped with an outer screw threaded which forms a gudgeon together with the screwed-on nut 18. The screwed-on nut 18 also presses the second flange 16 firmly against the outer top side of the annular element 8 and possibly also against annular shoulder 19 of the extension 3. Furthermore, cooperating wedges 20 are present on the inner surface of the second flange 16 and the outer surface of the second surface part of the extension 3.

The openings of the second flange 16 contain gudgeon bolts 21 for the attachment of a wheel to the roller bearing unit, which wheel is centered by the gudgeon 17, 18. The gudgeon bolts 21 are easy to insert or replace because there is now a relatively large space between the first flange 10 and the second flange 16.

Figure 2:
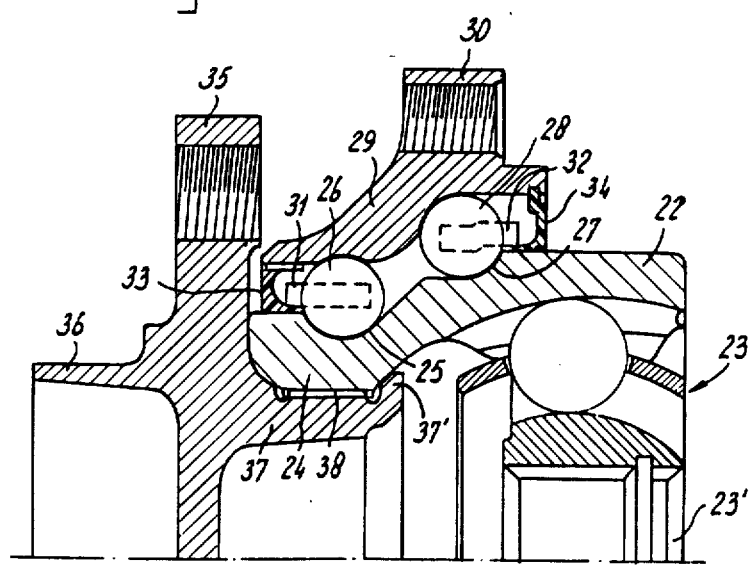

The embodiment shown in FIG. 2 includes an inner race 22 which contains a homokinetic coupling 23 with a part for insertion 23' for coupling with a drive shaft. The inner race 22 has an extension 24 with—directly formed in its outer surface—a rotating track 25 for the row of rolling elements 26. A second rotating track 27 is formed in the outer surface of the inner race 22 and has a larger diameter than the track 25 so that more rolling elements can be inserted compared to the first row of rolling elements (26). The track 27 serves to support the row of rolling elements 28. The rows of rolling elements 26 and 28 are surrounded by an outer race 29, generally conical in shape, which forms one unit with the flange for attachment 30. In addition there are, similarly to the type of execution shown in FIG. 1, the cages 31 and 32 and the sealing rings 33 and 34 which are, contrary to the cage and sealing elements in the known bearing, simpler in shape.

The most significant difference between the embodiment shown in FIG. 2 and the embodiment in FIG. 1 is the fact that in the embodiment according to FIG. 2 the second flange 35 forms one unit with the gudgeon 36, whereby the element consisting of the second flange 35 and the gudgeon 36 includes also an extension 37 directed axially inward, which is fastened inside the extension 24 of the inner race by upsetting the end part 37' and by means of the wedges 38.

Figure 3:
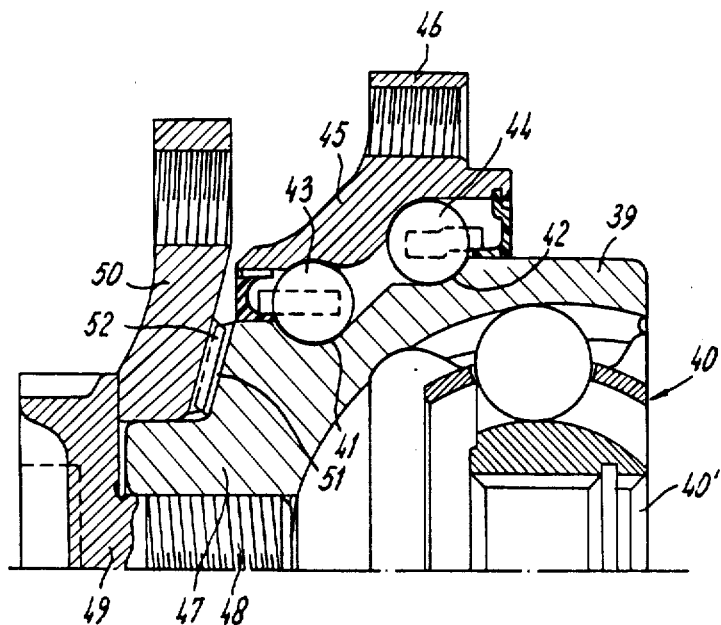

The embodiment shown in FIG. 3 includes an inner race 39 which contains a homokinetic coupling 40 with a part for insertion 40' for coupling with a drive shaft. In this case both tracks 41 and 42 for the rows of rolling elements 43, respectively 44, are provided in the outer surface of the inner race 39. The rows of rolling elements 43 and 44 are in turn surrounded by an outer race 45 which forms one unit with a first flange 46. The cages and sealing rings without referemce numbers also corresponding fully to the cages and sealing rings of the embodiments according to FIGS. 1 and 2.

The inner race 39 includes an extension 47 equipped with an inside screw thread in which the bolt 48 is screwed tightly. The bolt has a head 49 which forms, at the same time, a gudgeon for centering the wheel to be attached.

The second flange 50 is formed by a separate annular element mounted around the outer surface of the extension 47 and prssed against the shoulder 51 by the head 49 of the bolt 48, whereby the cooperating wedges 52 are shaped on this shoulder 51 and the side part oriented in that direction of the annular element 50.

Figure 4:
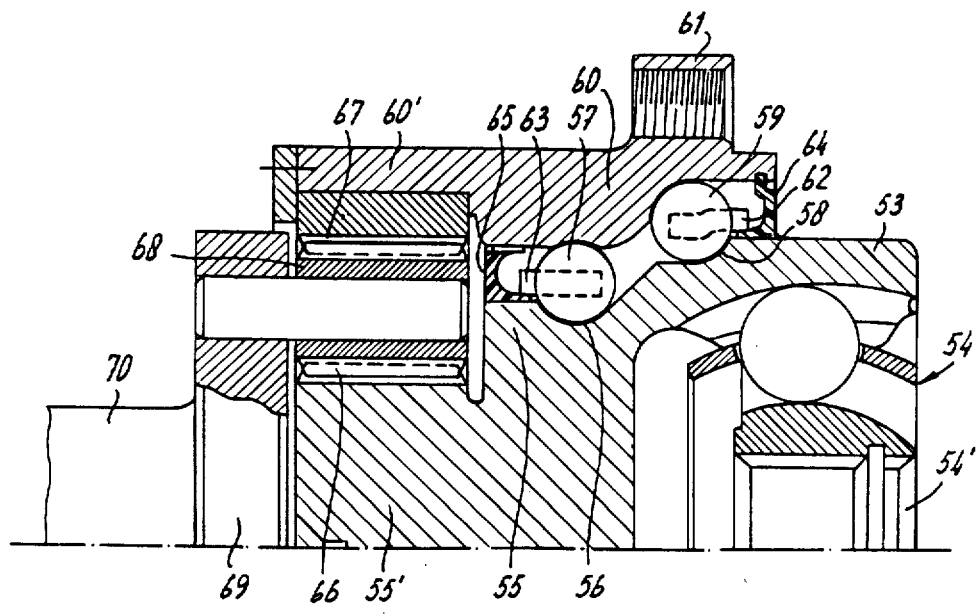

FIG. 4 shows an embodiment which includes an inner race 53 which contains a homokinetic coupling 54 with a part for insertion 54' for coupling a drive shaft. The inner race 53 has an extension 55 in which rotating track 56 for the row of rolling elememts 57 has been provided. The second rotating track 58 for the row of rolling elements 59 is formed in the outer surface of the inner race 53 and has a larger diameter than the track 56. The rows of rolling elements 57 and 58 are surrounded by an outer race 60 equipped with an axial extension 60' and forming one unit with the flange 61. Furthermore, in the same manner as in the embodiments shown in FIG. 1, there are the cages 62 and 63 and the sealing rings 64 and 65.

In this embodiment the means of attachment consist of a toothed ring 66 shaped along the outer surface of an extension 55' of the extension 55 and, coaxially therewith, a toothed ring 67 shaped along the inner surface of the extension 60' of the outer race 60, and a number of planetary gears 68 located between and interlocking with these toothed rings 66, 67, and rotating on a planetary gear carrier 69 connected to a shaft 70.

I claim:

1. In a roller bearing unit comprising an outer element of a homokinetic coupling, means for coupling one end of the outer element to a rotatable element, with said one end of said outer element having a larger diameter than the other end thereof, and a coaxial extension at the other end of the outer element, first and second rotating tracks for two rows of rolling elements being provided on the radially outer surface of the outer element in planes perpendicular to the axis of the bearing unit, an outer race surrounding the rolling elements and being unitary with a radially extending flange coaxial with said axis for the mounting of the roller bearing unit, and means coaxial with and connected to the extension for the attachment of an element to be rotated, the rolling elements of each row being separated by a cage; the improvement wherein the rotating tracks tor the rolling elements have different diameters, said first track being located toward said one end of the outer element having a larger diameter than the second track, said first track being formed directly in the outer surface of said outer element at a location thereof where said outer element has a greater diameter than the diameter thereof at said other end, said outer race having a generally conical shape.

2. The roller bearing of claim 1 wherein said coaxial extension of said outer element has a wedge or tooth shaped coupling thereon.

3. The roller bearing of claim 1 wherein said means for the attachment of an element comprises a second flange, further comprising a gudgeon extending axially and forming a part of said second flange.

4. The roller bearing of claim 3 wherein said gudgeon forms a unitary element with said second flange.

5. The roller bearing of claim 4 wherein said unitary second flange and gudgeon is affixed to the inside of said extension of said outer element.

6. The roller bearing of claim 5 wherein said unitary element includes an extension that is directed inwardly and is coaxial with said bearing unit, and is fastened inside said extension of said outer element.

7. The roller bearing of claim 3 wherein said outer element has a shoulder, and further comprising a screw device, said second flange comprising a separate element that is mounted on said extension of said outer element and pressed against said shoulder by said screw device.

8. The roller bearing of claim 7 wherein said screw device comprises a bolt having a head forming a gudgeon, said bolt being threaded tightly in said extention, said head pressing said second flange against said shoulder.

9. The roller bearing of claim 7 wherein said extension has external threads, said screw device comprising a nut threaded on said external threads and pressing said second flange against said shoulder.

10. The roller bearing of claim 9 wherein said nut together with the threaded part of said extension define a gudgeon.

11. The roller bearing of claim 3 wherein said second flange has a plurality of holes therein, and further comprising gudgeon bolts in said holes.

12. The roller bearing of claim 1 wherein said attachment means comprises a first toothed ring formed along the outer surface of said extension and coaxial therewith, a second toothed ring formed along an inner surface of an extension of said outer race, planetary gear means between and interlocking said first and second toothed rings, and a planetary gear carrier for rotatably holding said planetary gear means.

13. The roller bearing of claim 1 wherein said second track comprises a separate annular race mounted on said outer element.

14. The roller bearing of claim 13 wherein said attachment means comprises a second flange mounted on said extension and pressed against said annular race.

15. The roller bearing of claim 1 wherein said second track is formed in the outer surface of said outer element.

16. The roller bearing of claim 15 wherein said attachment means comprises a second flange affixed to the interior of said extension.

17. The roller bearing of claim 15 wherein said attachment means comprises a second flange, and further comprising bolt means threaded in said other end of said outer element for holding said second flange on said extension.

18. The roller bearing of claim 15 wherein said outer race has an extension toward said other end of said outer element, and further comprising facing teeth on said extensions of said outer element and outer race, and planetary gears engaging said teeth, said attachment means comprising planetary gear carrier means rotatably holding said planetary gears.

* * * * *

UNITED STATES PATENT AND TRADEMARK OFFICE
CERTIFICATE OF CORRECTION

PATENT NO. : 4,668,111
DATED : May 26, 1987
INVENTOR(S) : Hendrikus, Jan Kapaan

It is certified that error appears in the above—identified patent and that said Letters Patent is hereby corrected as shown below:

On the title page, item 75, Inventor: change "Hendikus" to --Hendrikus--.

On the title page, item 73, Assignee: change "Niewegein" to --Nieuwegein--.

Column 1, line 50, omit "," after "while" and "time".

Column 4, line 19, change "prssed" to --pressed--.

Signed and Sealed this

Twenty-first Day of June, 1988

Attest:

DONALD J. QUIGG

*Attesting Officer*   *Commissioner of Patents and Trademarks*